US009453124B2

(12) United States Patent
Hashemzadeh

(10) Patent No.: US 9,453,124 B2
(45) Date of Patent: Sep. 27, 2016

(54) MODIFIED COMPOSITE PARTICLES

(75) Inventor: Abdulmajid Hashemzadeh, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/000,201

(22) PCT Filed: Feb. 16, 2012

(86) PCT No.: PCT/EP2012/052723
§ 371 (c)(1),
(2), (4) Date: Aug. 16, 2013

(87) PCT Pub. No.: WO2012/110618
PCT Pub. Date: Aug. 23, 2012

(65) Prior Publication Data
US 2013/0337266 A1 Dec. 19, 2013

(30) Foreign Application Priority Data

Feb. 18, 2011 (DE) ........................ 10 2011 004 361

(51) Int. Cl.
| C08L 43/04 | (2006.01) |
| B82Y 30/00 | (2011.01) |
| C08F 2/44 | (2006.01) |
| C08K 3/22 | (2006.01) |
| C09C 1/30 | (2006.01) |
| C09C 3/10 | (2006.01) |
| C09D 5/03 | (2006.01) |
| C08F 292/00 | (2006.01) |
| C08F 212/08 | (2006.01) |
| C08F 220/06 | (2006.01) |
| C08F 220/14 | (2006.01) |
| C08F 220/18 | (2006.01) |
| C08F 230/08 | (2006.01) |
| C08K 9/08 | (2006.01) |

(52) U.S. Cl.
CPC ............. *C08L 43/04* (2013.01); *B82Y 30/00* (2013.01); *C08F 2/44* (2013.01); *C08F 292/00* (2013.01); *C08K 3/22* (2013.01); *C09C 1/3072* (2013.01); *C09C 3/10* (2013.01); *C09D 5/03* (2013.01); *C01P 2004/62* (2013.01); *C01P 2004/64* (2013.01); *C08F 212/08* (2013.01); *C08F 220/06* (2013.01); *C08F 220/14* (2013.01); *C08F 220/18* (2013.01); *C08F 230/08* (2013.01); *C08K 9/08* (2013.01); *Y10T 428/2998* (2015.01)

(58) Field of Classification Search
None
See application file for complete search history.

(56) References Cited

U.S. PATENT DOCUMENTS

| 3,544,500 | A | 12/1970 | Osmond et al. | |
| 4,387,138 | A * | 6/1983 | Gift | 428/407 |
| 4,421,660 | A | 12/1983 | Solc nee Hajna | |
| 6,517,941 | B1 * | 2/2003 | Murase | 428/412 |
| 6,620,516 | B1 | 9/2003 | Kurihara et al. | |
| 2003/0225190 | A1 * | 12/2003 | Borbely et al. | 523/201 |
| 2005/0212159 | A1 | 9/2005 | Richards et al. | |
| 2006/0194006 | A1 | 8/2006 | Bacher et al. | |
| 2007/0161740 | A1 | 7/2007 | Wiese et al. | |
| 2008/0051500 | A1 | 2/2008 | Wiese | |
| 2008/0098933 | A1 | 5/2008 | Killat | |
| 2008/0281035 | A1 | 11/2008 | Hashemzadeh et al. | |
| 2009/0258979 | A1 | 10/2009 | Hawkett et al. | |
| 2011/0015340 | A1 | 1/2011 | Hashemzadeh | |
| 2011/0201727 | A1 | 8/2011 | Hashemzadeh et al. | |
| 2012/0016060 | A1 | 1/2012 | Lohmeijer et al. | |

FOREIGN PATENT DOCUMENTS

| CN | 101448891 A | 6/2009 |
| DE | 10 2004 010 155 A1 | 9/2005 |
| DE | 10 2006 050 336 A1 | 5/2008 |
| DE | 10 2007 038 333 A1 | 2/2009 |
| DE | 10 2008 000 584 A1 | 9/2009 |
| EP | 1 243 619 A1 | 9/2002 |
| EP | 01 620 271 A1 | 2/2006 |
| EP | 2 265 663 A1 | 12/2010 |
| WO | 2004/098898 A1 | 11/2004 |
| WO | 2006/072464 A1 | 7/2006 |
| WO | 2007/057382 A1 | 5/2007 |
| WO | 2007/112503 A1 | 10/2007 |

(Continued)

OTHER PUBLICATIONS

English abstract for Houben-Weyl, Methoden der organischen Chemie.

(Continued)

*Primary Examiner* — Ronak Patel
(74) *Attorney, Agent, or Firm* — Caesar Rivise, PC

(57) ABSTRACT

The invention relates to methods for producing modified composite particles by A) mixing one or more finely divided inorganic solids and one or more organic polymers in a solvent or a mixture of several solvents, wherein finely divided inorganic solids are fixed to organic polymers and composite particles are thus formed. The organic polymers are based on a) one or more ethylenically unsaturated monomers having one or more additional functional groups selected from the group comprising carboxylic acid groups or derivatives thereof, silane groups, sulfonic acid groups, sulfate groups, phosphate groups, phosphonate groups, isocyanate groups, amine groups, quaternized amine groups, hydrazine groups, epoxy groups, ether groups, hydroxy groups, or CO groups, and b) one or more ethylenically unsaturated monomers which are different from monomers a), characterized in that subsequently B) one or more ethylenically unsaturated monomers are polymerized in the presence of the composite particles from step A).

13 Claims, No Drawings

(56) References Cited

FOREIGN PATENT DOCUMENTS

WO 2009/112370 A1 9/2009
WO 2010/118961 A1 10/2010

OTHER PUBLICATIONS

Dong-Ming Qi, J. of Applied Polym. Sci., 2006, vol. 99, Seiten 3425 bis 3432.
Tsutomu Mizutani, J. of Applied Polym. Sci., 2006, vol. 99, seiten 659 bis 669.
Frank Bauer, Macromol. Mater. Eng., 2006291, Seiten 493 bis 498.
E. Matijevic, Chem. Mater. 1993, 5, Seiten 412 bis 426.
Ullmann's Encyclopedia of Industrial Chemistry, vol. A 23, Seiten 583 bis 660, Verlag Chemie, Weinheim, 1992.
D.F. Evans, H. Wennerström in The Colloidal Domain, Seiten 363 bis 405, Verlag Chemie, Weinheim, 1994.
RJ. Hunter, Foundations of Colloid Science, vol. I, Seiten 10 bis 17, Clarendon Press, Oxford, 1991.
Noll, Chemie and Technologie der Silikone, 2. Auflage 1968, Weinheim.
Houben-Weyl, Methoden der organischen Chemie, Band E20, Georg Thieme Verlag, Stuttgart (1987).
English abstract for Noll, Chemie and Technologie der Silikone.
Fox T.G., Bull. Am. Physics Soc. 1, 3, p. 123 (1956).
Polymer Handbook 2nd Edition, J. Wiley & Sons, New York (1975).
International Search Report for PCT/EP2012/052723 dated May 22, 2012.

\* cited by examiner

MODIFIED COMPOSITE PARTICLES

BACKGROUND OF THE INVENTION

The present invention relates to processes for producing modified composite particles based on organic polymers and fine organic solids, especially silicon oxides such as waterglass or silica sols, to the modified composite particles obtainable by the processes and to the use thereof, for example as an additive, binder or cobinder for different applications.

Composite particles comprise organic domains, for example an organic polymer matrix, and inorganic domains, for example fine inorganic solids, and typically have diameters of 4 to 5000 nm. The organic domains and the inorganic domains are generally joined to one another via physical or chemical bonds.

In commonly used processes for producing composite particles, organic monomers are polymerized by means of emulsion polymerization in aqueous dispersions of inorganic particles, with anchoring of organic domains on the surface of the inorganic particles, as described, for example, in Dong-Ming Qi, J. of Applied Polym. Sci., 2006, vol. 99, pages 3425 to 3432; Tsutomu Mizutani, J. of Applied Polym. Sci., 2006, vol. 99, pages 659 to 669; Frank Bauer, Macromol. Mater. Eng., 2006291, pages 493 to 498, or from DE-A 10 2004 010 155, U.S. Pat. No. 3,544,500, U.S. Pat. No. 4,421,660, WO-A 2006/072464 or WO-A 2010/118961.

However, the fixing of the organic and inorganic domains of the composite particles and the provision of stable composite particles present problems. This is because the inorganic particles or starting materials thereof and the organic monomers or the organic polymer matrices usually have different polarities and have a tendency to separate from one another or each to agglomerate with one another.

If such an agglomeration occurs before or during the production of the composite particles, for example, the agglomerated inorganic particles are encapsulated by the organic polymer matrix in the course of polymerization of the organic monomers, such that there is no homogeneous fixing of inorganic particles on the organic polymer matrix and hence ultimately no formation of chemically homogeneous composite particles formed from organic and inorganic domains. Corresponding mixtures in solvents do not take the form of colloidal primary particles. It may even be the case that the inorganic particles and the organic polymer matrix are present alongside one another as a blend.

However, in composite particles formed homogeneously from inorganic and organic domains too, there may be agglomeration of the inorganic or organic domains, which leads to inadequate storage stability, especially of dissolved, emulsified or dispersed composite particles, and is manifested by gellation or speck formation. Especially at relatively high temperatures, for example from 40° C., such an agglomeration occurs. Equally, aqueous dispersions of particles formed exclusively from inorganic units, for example colloidal silica or organopolysiloxanes, have a tendency to agglomeration at relatively high temperatures, for example at 70° C., or even at room temperature.

Agglomerated composite particles no longer have the desired performance properties or are even entirely unusable. In order to provide, for example, stable aqueous dispersions of composite particles, emulsifiers, protective colloids or specific additives are typically added as stabilizers, for example the hydroxyl group containing alkylamino compounds recommended in DE-A 10 2004 010 155.

To solve the aforementioned problems, WO-A 2009/112370 proposes composite particles which have been produced by condensation of siloxanes or polysiloxanes in the presence of polymers containing, for example, silane, amine or epoxy groups. However, aqueous dispersions of the composite particles thus obtainable with high solids contents have high viscosities, such that they can be handled only with difficulty. Finally, providing composite dispersions with high solids contents in stable form also presents particular difficulties. The aforementioned problems occur to a particular degree in the case of aqueous composite dispersions having solids contents above 30%.

It was an object of the present invention to provide processes for producing modified composite particles, with which the abovementioned disadvantages are avoided. More particularly, modified composite particles should thus be obtainable, these also being storage-stable in the form of dispersions with high solids contents and having a low viscosity.

The object was surprisingly achieved by fixing fine inorganic solids onto organic polymers, for example in the course of condensation of silicon compounds in the presence of organic polymers, and then polymerizing ethylenically unsaturated monomers in the presence of the composite particles thus obtained, forming the inventive modified composite particles.

There are known composite particles which are obtained by free-radically initiated copolymerization of ethylenically unsaturated organic monomers and ethylenically unsaturated inorganic particles, for example the ethylenically unsaturated siloxanes proposed in EP-A 1620271.

WO-A 2007/057382 describes silane-modified polyvinyl alcohols which are obtained by free-radically initiated polymerization of ethylenically unsaturated, silane-containing monomers in the presence of polyvinyl alcohols.

DE-A 102007038333 discloses compositions which have been produced by condensation of silicon compounds in the presence of polyvinyl alcohols, although the inorganic particles formed were not fixed on polyvinyl alcohols but were present alongside these in the composition as a blend.

EP-A 1243619 discloses composite materials consisting of organic domains, such as polyacrylic acid, and inorganic domains, for example sodium silicates or colloidal silica, the organic and inorganic domains being joined by ionic interactions with divalent metal cations, such that the composite materials are present as aggregates of the polymeric domains in the form of gels.

DESCRIPTION OF THE INVENTION

The invention provides processes for producing modified composite particles by

A) mixing one or more fine inorganic solids and one or more organic polymers in a solvent or a mixture of a plurality of solvents, with fixing of fine inorganic solids onto organic polymers and hence formation of composite particles, and where the organic polymers are based on
a) one or more ethylenically unsaturated monomers having one or more further functional groups selected from the group comprising carboxylic acid groups or derivatives thereof, silane groups, sulfo groups, sulfate groups, phosphate groups, phosphonate groups, isocyanate groups, amine groups, quaternized amine groups, hydrazine groups, epoxy groups, ether groups, hydroxyl groups or CO groups, and
b) one or more ethylenically unsaturated monomers other than the monomers a), characterized in that subsequently B) one or more ethylenically unsaturated monomers are polymerized in the presence of the composite particles from step A).

The invention further provides modified composite particles obtained by the aforementioned processes.

The fixing of the fine inorganic solids onto the organic polymers means more particularly that the fine inorganic solids are joined to organic polymers via chemical bonds, such as ionic or especially covalent bonds. Crucial requirements for this fixing are the monomer units a) of the organic polymers. The fine inorganic solids are fixed essentially in random distribution on the polymer chain of the organic polymer of the respective composite particle from step A). The chemical bonds are generally formed by condensation reactions between the fine inorganic solids and the organic polymers. In a condensation reaction, a fine inorganic solid is joined to an organic polymer with elimination of a simple molecule, usually water.

The fine inorganic solids are preferably metals or metal compounds, such as metal oxides or metal salts, semimetals or semimetal compounds, such as semimetal oxides or semimetal salts. Suitable metals are, for example, noble metal colloids, such as colloids of palladium, silver, ruthenium, platinum, gold or rhodium or alloys thereof. Metal oxides are, for example, the oxides of titanium, zirconium, tin, aluminum, barium, magnesium, iron, chromium, antimony, bismuth, zinc, nickel, cobalt, copper, yttrium or cerium, or the hydroxy oxides thereof. Examples of metal salts are metal sulfides, metal sulfates, carbonates, metal carbonates, phosphates, silicates, aluminates or borates. Corresponding examples are sulfides of iron, tin, mercury, cadmium, zinc, copper, silver, nickel, cobalt, manganese, chromium, titanium, zirconium, antimony or bismuth; sulfates, carbonates, phosphates, aluminates or borates of alkaline (earth) metals, zinc, zirconium, iron, aluminum or tin; silicates such as lithium orthosilicate, calcium/magnesium orthosilicate, aluminum orthosilicate, iron (II) orthosilicate, iron (III) orthosilicate, magnesium orthosilicate, zinc orthosilicate, zirconium (III) orthosilicate, zirconium (IV) orthosilicate, metasilicates such as lithium metasilicate, calcium/magnesium metasilicate, calcium metasilicate, magnesium metasilicate, zinc metasilicate, sheet silicates such as sodium aluminum silicate or sodium magnesium silicate.

A preferred semimetal compound is silicon dioxide. Silicon dioxide may be in amorphous form and/or in different crystal structures. Suitable silicon dioxide is also known under the trade names Aerosil®, Nalco®, Levasil®, Ludox®, Nyacol®, Bindzil® and Snowtex®. Silicon dioxide may, for example, be in the form of waterglass or silica sols.

The preparation of the fine inorganic solids is known to those skilled in the art and is effected, for example, by precipitation reactions or chemical reactions in the gas phase (cf. E. Matijevic, Chem. Mater. 1993, 5, pages 412 to 426; Ullmann's Encyclopedia of Industrial Chemistry, vol. A 23, pages 583 to 660, Verlag Chemie, Weinheim, 1992; D. F. Evans, H. Wennerström in The Colloidal Domain, pages 363 to 405, Verlag Chemie, Weinheim, 1994 and RJ. Hunter in Foundations of Colloid Science, vol. I, pages 10 to 17, Clarendon Press, Oxford, 1991).

In a preferred embodiment, step A) of the present invention is performed by condensing one or more silicon compounds in a solvent or a mixture of a plurality of solvents in the presence of the aforementioned organic polymers, the silicon compounds being selected from the group comprising α) compounds of the general formula $$(RO)_n SiR^1_{4-n} \quad (1)$$

in which
R is an optionally substituted alkyl or aryl radical having 1 to 20 carbon atoms or a hydrogen atom,
$R^1$ is an optionally substituted hydrocarbyl radical or a hydrogen atom, and
n assumes a value of 1 to 4, and
β) one or more condensation products of the compounds of the formula (1).

In the silicon compounds of the formula (1), the R radicals are preferably unsubstituted. More preferably, the R radical in the formula (1) is methyl, ethyl or propyl, cyclohexyl, phenyl, most preferably methyl or ethyl.

Preferably, the $R^1$ radical is an alkyl radical or an aryl radical, more preferably methyl, ethyl, propyl, cyclohexyl, isooctyl or phenyl and most preferably methyl or ethyl.

Preferably, the $R^1$ radical is also an $R^2X$ group in which the $R^2$ radical is an optionally substituted alkylene radical having 1 to 20 carbon atoms, preferably having 1 to 6 carbon atoms,
in which mutually nonadjacent methylene units may be replaced by —O— groups, and
X is bonded via a covalent bond to the $R^2$ radical and is an amino radical $NHR^3$, an epoxy radical $CR^4(O)CR^5R^6$, a urethane radical $NR^3$—C(=O)$OR^3$, a urea radical $NR^3$—C(=O)$NR^3R^4$, a phosphoric acid radical P(=O)(OH)$_2$, an anhydride radical C(=O)O(O=)$CR^3$ or a carboxylic acid radical, where $R^3$ is a hydrogen atom or an optionally substituted alkyl, aryl or aminoalkyl radical having 1 to 10 carbon atoms, $R^4$, $R^5$, $R^6$ are each a hydrogen atom or an optionally substituted alkyl or aryl radical having 1 to 10 carbon atoms, where the respective $R^2$, $R^3$, $R^4$, $R^5$ and $R^6$ radicals each assume their values independently of one another, and where the $R^2X$ group is bonded via a carbon atom of the $R^2$ radical to the silicon atom of the formula (1).

Preferably, the $R^2$ radicals of the $R^2X$ group are unsubstituted. More preferably, $R^2$ is an alkylene radical having 1 to 6 carbon atoms, most preferably methylene, ethylene or propylene.

Preferably, $R^3$ is a hydrogen atom, an alkyl, aryl or aminoalkyl radical having 1 to 6 carbon atoms, more preferably hydrogen atom, 2-aminoethyl, phenyl, cyclohexyl, methyl, ethyl, propyl or butyl.

The $R^4$, $R^5$, $R^6$ radicals are preferably each a hydrogen atom.

Preferably, n assumes a value of 2 to 4, more preferably the value of 3 or 4.

The individual R, $R^1$, $R^2$, $R^3$, $R^4$, $R^5$, $R^6$ and X radicals and the value n in the silicon compounds of the formula (1) are each defined independently of one another. In all embodiments of the formula (1), the silicon atom is tetravalent in each case.

Examples of silicon compounds of the formula (1) are tetramethoxysilane, tetraethoxysilane, methyltrimethoxysilane, methyltriethoxysilane, dimethyldimethoxysilane, dimethyldiethoxysilane, isooctyltrimethoxysilane, isooctyltriethoxysilane, (cyclohexyl)methyldimethoxysilane, dicyclopentyldimethoxysilane or phenyltriethoxysilane. Preferred silanes of the formula (1) are tetramethoxysilane, tetraethoxysilane, methyltrimethoxysilane, methyltriethoxysilane, isooctyltrimethoxysilane, isooctyltriethoxysilane or phenyltriethoxysilane. Particular preference is given to tetramethoxysilane, tetraethoxysilane, methyltrimethoxysilane, methyltriethoxysilane.

Further examples of silicon compounds of the formula (1) are (3-aminopropyl)triethoxysilane, (3-aminopropyl)trimethoxy-silane, N-(2-aminoethyl)(3-aminopropyl)triethoxysilane, N-(2-aminoethyl)(3-aminopropyl)trimethoxysilane, N-(2-amino-ethyl)(3-aminopropyl)methyldimethoxysilane, 3-(triethoxy-silyl)propylsuccinic anhydride, N-cyclohexylaminomethylmethyl-diethoxysilane, N-(3-(triethoxysilyl)propyl)methylurethane, N-(3-(trimethoxysilyl)propyl)methylurethane, N-(3-(triethoxy-silyl)propyl)urea, N-(3-(trimethoxysilyl)propyl)urea, (3-glycidoxypropyl)triethoxysilane, and (3-glycidoxypropyl)-trimethoxysilane. Preference is also given to (3-aminopropyl)-triethoxysilane or (3-glycidoxypropyl)triethoxysilane.

Preferably, in the preparation of the composite particles in step A), at least one silicon compound of the formula (1) in which n assumes a value of 1 to 3 is used, i.e. one in which the silicon atom is not exclusively substituted by alkoxy, aryloxy or hydroxyl groups.

Optionally, in the case of condensation of silicon compounds of the formula (1), for production of the composite particles, it is additionally possible to use one or more ethylenically unsaturated silicon compounds of the general formula (2) $R^7SiR^8{}_{0-2}(OR^9)_{1-3}$ in which $R^7$ is defined as $CH_2=CR^{10}—(CH_2)_{0-1}$ or $CH_2=CR^{10}CO_2(CH_2)_{1-3}$, $R^8$ is defined as $C_1$- to $C_3$-alkyl radical, $C_1$- to $C_3$-alkoxy radical or halogen, preferably Cl or Br, $R^9$ is an unbranched or branched, optionally substituted alkyl radical having 1 to 12 carbon atoms, preferably 1 to 3 carbon atoms, or is an acyl radical having 2 to 12 carbon atoms, where $R^9$ may optionally be interrupted by an ether group, and $R^{10}$ is H or $CH_3$.

Preferred ethylenically unsaturated silicon compounds of the formula (2) are γ-acryloyl- or γ-methacryloyloxypropyltri(alkoxy)silanes, α-methacryloyloxymethyltri(alkoxy)silanes, γ-methacryloyloxypropylmethyldi(alkoxy)silanes; vinylsilanes such as vinylalkyldi(alkoxy)silanes and vinyltri(alkoxy)silanes, where the alkoxy groups used may, for example, be methoxy, ethoxy, methoxyethylene, ethoxyethylene, methoxy propylene glycol ether or ethoxy propylene glycol ether radicals. Examples of preferred unsaturated silicon compounds of the formula (2) are 3-methacryloyloxypropyltri-methoxysilane, 3-methacryloyloxypropylmethyldimethoxysilane, vinyltrimethoxysilane, vinylmethyldimethoxysilane, vinyltri-ethoxysilane, vinylmethyldiethoxysilane, vinyltripropoxysilane, vinyltriisopropoxysilane, vinyltris(1-methoxy) isopropoxysilane, vinyltributoxysilane, vinyltriacetoxysilane, methacryloyloxymethyltrimethoxysilane, 3-methacryloyloxypropyltris (2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexoxysilane, vinyltrioctyloxysilane, vinyldimethoxyoctyloxysilane, vinylmethoxydioctyloxysilane, vinylmethoxydilauryloxysilane, vinyldimethoxylauryloxysilane, and also polyethylene glycol-modified vinylsilanes.

Particularly preferred ethylenically unsaturated silicon compounds of the formula (2) are vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-methacryloyl-oxypropyltrimethoxysilane, 3-methacryloyloxypropylmethyldimethoxysilane and methacryloyloxymethyltrimethoxysilane, and mixtures thereof.

In addition, in the condensation of silicon compounds of the formula (1), for production of the composite particles, it is possible to use one or more ethylenically unsaturated silicon compounds of the general formula (3) $CH_2=CR^{11}—CO—NR^{12}—R^{13}—SiR^{14}{}_n—(R^{15})_{3-n}$ in which n=0 to 4, m=0 to 2, $R^{11}$ is either H or a methyl group, $R^{12}$ is H or an alkyl group having 1 to 5 carbon atoms, $R^{13}$ is an alkylene group having 1 to 5 carbon atoms or a bivalent organic group in which the carbon chain is interrupted by an oxygen or nitrogen atom, $R^{14}$ is an alkyl group having 1 to 5 carbon atoms, $R^{15}$ is an alkoxy group which has 1 to 40 carbon atoms and may be substituted by further heterocycles. In silicon compounds of the formula (3) in which 2 or more $R^{11}$ or $R^{15}$ groups occur, these may be identical or different.

Examples of silicon compounds of the formula (3) are: 3-(meth)acrylamidopropyltrimethoxysilane, 3-(meth)acrylamido-propyltriethoxysilane, 3-(meth)acrylamidopropyltri (β-methoxy-ethoxy)silane, 2-(meth)acrylamido-2-methylpropyltrimethoxy-silane, 2-(meth)acrylamido-2-methylethyltrimethoxysilane, N-(2-(meth)acrylamidoethyl)aminopropyltrimethoxysilane, 3-(meth)acrylamidopropyltriacetoxysilane, 2-(meth)acrylamidoethyltrimethoxysilane, 1-(meth)acrylamidomethyltrimethoxy-silane, 3-(meth)acrylamidopropylmethyldimethoxysilane, 3-(meth)acrylamidopropyldimethylmethoxysilane, 3-(N-methyl-(meth)acrylamido)propyltrimethoxysilane, 3-((meth)acrylamido-methoxy)-3-hydroxypropyltrimethoxysilane, 3-((meth)acrylamido-methoxy)propyltrimethoxysilane, N,N-dimethyl-N-trimethoxysilylpropyl-3-(meth)acrylamidopropylammonium chloride and N,N-dimethyl-N-trimethoxysilylpropyl-2-(meth)acrylamido-2-methyl-propylammonium chloride.

In the case of use of the silicon compounds of the formula (1) in step A), in the course of the condensation, preferably ≥30%, more preferably ≥40% and most preferably 70 to 80% of the hydrolyzable or condensable bonds of the silicon compounds of the formula (1) and optionally of the formulae (2) and (3), based on the total number of hydrolyzable or condensable bonds of the silicon compounds mentioned, are joined to the organic polymers or the silicon compounds or condensation products thereof used. Hydrolyzable bonds are especially the alkoxy groups RO of the formula (1) or the alkoxy groups $OR^9$ of the formula (2). Condensable bonds are especially the OH groups bonded to silicon atoms.

The condensation products β) are preferably organopolysiloxanes formed from units of the general formula

in which
x is 0, 1, 2 or 3 and y is 0, 1 or 2,
with the proviso that the sum x+y≤3,
$R^1$ may be the same or different and may assume the definitions given above for the formula (1), and
R may be the same or different and may assume the definitions given above for the formula (1).

Preferred, more preferred and most preferred R and $R^1$ radicals are the same radicals which have been listed correspondingly for the formula (1) above.

The particle size of the organopolysiloxanes is preferably 4 to 900 nm, more preferably 4 to 40 nm and most preferably 4 to 30 nm (determined by means of transmission electron microscopy; with the Libra 120 instrument from Zeiss).

The silicon compounds α), the condensation products β) and the silicon compounds of the formulae (2) and (3) are also referred to collectively hereinafter as silicon components.

The silicon compounds α) and/or the condensation products β) are used, in total, in the production of the composite particles preferably to an extent of 20 to 100% by weight and more preferably to an extent of 60 to 80% by weight, based in each case on the dry mass of the total amount of silicon components used.

The silicon compounds of the formulae (2) and (3) are each independently used preferably to an extent of 0 to 40% by weight, based in each case on the dry mass of the total amount of silicon components used.

The silicon components are commercial products or are preparable by standard methods, as described, for example, in Noll, Chemie and Technologie der Silikone [Chemistry and Technology of the Silicones], $2^{nd}$ edition 1968, Weinheim, or in Houben-Weyl, Methoden der organischen Chemie [Methods of Organic Chemistry], volume E20, Georg Thieme Verlag, Stuttgart (1987).

Particularly suitable fine inorganic solids are those whose solubility in water at 20° C. and atmospheric pressure (1 atm=1.013 bar absolute) is ≤1 g/l, preferably ≤0.1 g/l and especially preferably ≤0.01 g/l.

In the production of the composite particles in stage A), the proportion of fine inorganic solids is preferably 2 to 97% by weight, more preferably 20 to 95% by weight, most preferably 30 to 70% by weight, based in each case on the dry mass of the total amount of organic polymers and fine inorganic solids used.

The solvents used for the process according to the invention may be water or an organic solvent, optionally in combination with water, or a solvent mixture composed of a plurality of organic solvents, optionally in combination with water. Use of water as a solvent or as a component of the solvent mixture is not absolutely necessary, since the residual water present in the commercially available starting materials is sufficient for execution of the process according to the invention.

Suitable organic solvents are, for example, alcohols having 1 to 6 carbon atoms, such as methanol, ethanol, n-propanol or i-propanol, ketones such as acetone or methyl ethyl ketone, esters such as methyl acetate, ethyl acetate, propyl acetate or butyl acetate. Preferred solvents are water or i-propanol. Preferred solvent mixtures comprise water and i-propanol.

The organic polymers are organic soluble in the respective solvent or solvent mixture according to the invention at any temperature within the temperature range from 1 to 100° C., preferably from 20 to 60° C., and at any pH between 2 and 12, preferably to an extent of at least 1 g per liter of solvent or solvent mixture. The inventive solutions having a solids content of organic polymers of 10% by weight have a turbidity of preferably ≤600 EBC (according to formazin standard to DIN 38404; determined with the model TA6FS/Model 251 turbidimeter from Metrisa GmbH). Because of these organicity properties, separation and aggregation of the organic polymers in the course of production of the composite particles is suppressed.

The organic polymers are obtainable by free-radically initiated polymerization of one or more monomers a) and one or more monomers b).

The preferred functional groups in the monomers a) are selected from the group comprising carboxylic acid groups or derivatives thereof, such as esters, amides, nitriles or anhydrides, or silane, sulfo, epoxy, ether, hydroxyl or CO groups.

Derivatives of carboxylic acid groups are, for example, esters, amides, nitriles or anhydrides.

Typically, the monomers a) have 2 to 15 carbon atoms.

Examples of monomers a) are ethylenically unsaturated mono- and dicarboxylic acids, preferably acrylic acid, methacrylic acid, crotonic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters, and also maleic anhydride, ethylenically unsaturated sulfonic acids or salts thereof, preferably vinylsulfonic acid, 2-acrylamido-2-methylpropanesulfonic acid; ethylenically unsaturated epoxides, such as glycidylmethacrylate or glycidyl acrylate; ethylenically unsaturated silanes such as the silicon compounds of the above-specified formula (2) or (3), for example acryloyloxypropyltri(alkoxy)- or methacryloyloxypropyltri(alkoxy)silanes, vinyltrialkoxysilanes, vinylmethyldialkoxysilanes, vinyldimethylfluorosilane, styreneethyltrialkoxysilanes, where the alkoxy groups present may, for example, be methoxy, ethoxy and ethoxy propylene glycol ether radicals; ethylenically unsaturated hydroxyl or keto compounds, for example hydroxyalkyl methacrylates and acrylates, such as hydroxyethyl, hydroxypropyl or hydroxybutyl acrylate, or hydroxyethyl, hydroxypropyl or hydroxybutyl methacrylate, and compounds such as diacetoneacrylamide and acetylacetoxyethyl acrylate or methacrylate; or vinyl ethers such as methyl, ethyl or isobutyl vinyl ether.

Particularly preferred monomers a) are ethylenically unsaturated monocarboxylic acids, such as especially acrylic acid, methacrylic acid or crotonic acid, vinyltrialkoxysilanes such as especially vinyltriethoxysilane, or hydroxyethyl or hydroxypropyl acrylate or hydroxyethyl or hydroxypropyl methacrylate.

For preparation of the organic polymers, preferably 0.01 to 30% by weight, more preferably 0.1 to 20% by weight and most preferably 0.1 to 12% by weight of monomers a) are used, based on the total weight of all of the monomers used in the polymerization for preparation of the organic polymers.

Ethylenically unsaturated silanes are used here to an extent of preferably 0.01 to 5% by weight, especially preferably 0.01 to 3% by weight, more preferably 0.1 to 2% by weight and most preferably 0.2 to 1.5% by weight, based on the total weight of all the monomers used in the polymerization for preparation of the organic polymers.

Ethylenically unsaturated monocarboxylic acids are used here to an extent of preferably 1 to 12% by weight, more preferably 2 to 10% by weight and most preferably 3 to 8% by weight, based on the total weight of all the monomers used in the polymerization for preparation of the organic polymers. The use of the inventive amounts of ethylenically unsaturated carboxylic acids leads to modified composite particles which, especially also at high solids contents, are particularly storage-stable or have the desired viscosity.

The ethylenically unsaturated monomers b) are generally one or more monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins and dienes, vinylaromatics and vinyl halides.

Vinyl esters preferred among the monomers b) are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 to 13 carbon atoms, for example VeoVa9R or VeoVa10R (trade names of Shell). Particular preference is given to vinyl acetate.

Preferred methacrylic esters or acrylic esters are esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate.

Preferred olefins or dienes are ethylene, propylene and 1,3-butadiene. Preferred vinylaromatics are styrene and vinyl-toluene. A preferred vinyl halide is vinyl chloride.

The preferred monomers b) thus do not include any monomers a).

Examples of suitable organic polymers are (meth)acrylate addition polymers, styrene-(meth)acrylate addition polymers, vinyl ester addition polymers, each of which contain one or more different units of monomers a), the further functional groups of which are selected from the group comprising carboxylic acid groups or derivatives thereof, such as esters, amides, nitriles or anhydrides, or silane, sulfo, epoxy, ether, hydroxyl or CO groups.

Preferred organic polymers are addition polymers of vinyl esters, especially vinyl acetate, having 3 to 12% by weight of ethylenically unsaturated carboxylic acids, such as acrylic acid or methacrylic acid, and optionally 0.1 to 3% by weight of ethylenically unsaturated silanes, such as vinyltrimethoxy-silane, vinyltriethoxysilane, vinylmethyldimethoxysilane or vinylmethyldiethoxysilane; addition polymers of vinyl esters, especially vinyl acetate, with 0.1 to 3% by weight of ethylenically unsaturated silanes, such as vinyltrimethoxysilane, vinyltriethoxysilane, vinylmethyldimethoxysilane or vinylmethyldiethoxysilane, where the aforementioned addition polymers may also contain 5 to 45% by weight of butyl acrylate, VeoVa9, VeoVa10 or ethylene, and where the figures in % by weight add up to 100% by weight in each case.

Preferred organic polymers are also addition polymers of (meth)acrylic esters, such as methyl (meth)acrylate and/or n-butyl (meth)acrylate, with 3 to 12% by weight of ethylenically unsaturated carboxylic acids, such as acrylic acid or methacrylic acid, and optionally 0.1 to 3% by weight of ethylenically unsaturated silanes, such as vinyltrimethoxysilane, vinyltriethoxysilane, vinylmethyldimethoxysilane or vinylmethyldiethoxysilane; addition polymers of (meth)acrylic esters, such as methyl (meth)acrylate and/or n-butyl (meth)acrylate, with 0.1 to 3% by weight of ethylenically unsaturated silanes, such as vinyltrimethoxysilane, vinyltriethoxysilane, vinylmethyldimethoxysilane or vinylmethyldiethoxysilane, where the aforementioned addition polymers may also contain 0 to 50% by weight, especially 0.1 to 50% by weight, of styrene and where the figures in % by weight add up to 100% by weight in each case.

The selection of monomers or the selection of the proportions by weight of the comonomers is generally made so as to result in a glass transition temperature Tg of −60° C. to +120° C., preferably −50° C. to +100° C. The glass transition temperature Tg of the addition polymers can be determined in a known manner by means of differential scanning calorimetry (DSC). The Tg can also be predicted approximately by means of the Fox equation. According to Fox T. G., Bull. Am. Physics Soc. 1, 3, page 123 (1956): $1/Tg=x1/Tg1+x2/Tg2+ \ldots +xn/Tgn$, where xn represents the mass fraction (% by weight/100) of the monomer n, and Tgn is the glass transition temperature in Kelvin of the homopolymer of the monomer n. Tg values for addition homopolymers are listed in Polymer Handbook 2nd Edition, J. Wiley & Sons, New York (1975).

The organic polymers based on the monomers a) and b) can be prepared by suspension, miniemulsion or, preferably, emulsion polymerization processes known to those skilled in the art, as described, for example, in DE-A 102006050336. The emulsion polymerization process is preferably performed at a pH between 3 and 6.5.

In addition to the organic polymers based on the monomers a) and b), it is also possible in the process according to the invention to use the following detailed in WO-A 2009/112370: functionalized, partly or fully hydrolyzed polyvinyl alcohols, silane-modified polyvinyl alcohols, functionalized polyvinyl acetals or natural polymers, or chemically or physically modified natural polymers, or else cationic or anionic polyvinyl alcohols, polyvinyl alcohols containing units of isopropenyl acetate, VeoVa9, VeoVa10 or ethylene.

In the production of the composite particles in step A), the proportion of the organic polymers is preferably 3 to 98% by weight, more preferably 5 to 80% by weight and most preferably 30 to 60% by weight, based in each case on the dry mass of the total amount of organic polymers and fine inorganic solids used.

In step A), the fine inorganic solids and the organic polymers can be used in pure form or in a solvent. The fine inorganic solids are preferably used in one or more solvents, especially in water and optionally an additional solvent. The fine inorganic solids and the organic polymers can be initially charged completely in a solvent. Alternatively, a portion of the fine inorganic solids and of the organic polymers can be initially charged, and the remaining residue of the fine inorganic solids and of the organic polymers can be added. If the fine inorganic solids are initially charged in full or in part and the organic polymers are added at a later time, precondensation of the fine inorganic solids is optionally possible before fixing of the particles formed on the organic polymers. Preferably, the organic polymers are initially charged in a solvent or solvent mixture and the fine inorganic solids are added in pure form fully or partly during the condensation.

The temperature during the performance of step A) is preferably 1 to 100° C., more preferably 10 to 80° C. and most preferably 20 to 70° C. Step A) is executed preferably over 1 to 24 hours, more preferably over 2 to 12 hours.

The process for producing the composite particles of step A) is executed at pH values of preferably 1 to 14, more preferably of 7 to 12 and most preferably of 8 to 10. If the silicon compounds of the formula (1) bearing one or more epoxy radicals are used, the composite particles of step A) are produced preferably at pH values of 4 to 7.

The thus obtainable composite particles of step A) are in the form of a dispersion and preferably have a solids content of 10 to 55% by weight, more preferably of 20 to 45% by weight and most preferably of 30 to 40% by weight.

The composite particles of step A) preferably have a viscosity of 20 to 2000 mPas (Brookfield viscosity at 25° C. as a 25% solution in water).

The composite particles of step A) can be converted to powder, especially to water-redispersible powders, as described in WO-A 2265663.

The composite particles of step A) in the form of an aqueous dispersion having a solids content of 10% by weight have a turbidity of preferably ≤700 EBC, especially preferably ≤600 EBC, very especially preferably ≤400 EBC and most preferably ≤200 EBC (determination according to formazin standard to DIN 38404 at room temperature with the turbidimeter from Metrisa GmbH: TA6FS/model 251).

The inorganic domains of the composite particles of step A) have mean particle sizes of preferably 2 nm to 800 nm, more preferably of 4 nm to 100 nm and most preferably of 5 nm to 30 nm (determined with the Libra 120 transmission electron microscope from Zeiss).

For step B) of the process according to the invention, the ethylenically unsaturated monomers are preferably selected from the group comprising the monomers listed above as monomers a) and monomers b). In this context, preferred, more preferred and most preferred monomers are the same monomers which have been listed correspondingly above.

Examples of preferred ethylenically unsaturated monomers in step B) are one or more vinyl esters of carboxylic acids having 1 to 15 carbon atoms, one or more methacrylic esters or acrylic esters of carboxylic acids with unbranched or branched alcohols having 1 to 15 carbon atoms, one or more vinylaromatics, one or more olefins, one or more ethylenically unsaturated silanes or one or more ethylenically unsaturated monocarboxylic acids, each of which may assume the abovementioned preferred, more preferred or most preferred embodiments.

Optionally, 0 to 5% by weight, especially 0.1 to 2% by weight, based on the total weight of the ethylenically unsaturated monomers in stage B), of auxiliary monomers may also be copolymerized. The examples of auxiliary monomers are ethylenically unsaturated silicones, for example α,ω-divinylpolydimethylsiloxanes, α,ω-di(3-acryloyloxypropyl)polydimethylsiloxanes, α,ω-di(3-methacryloyloxypropyl)polydimethylsiloxanes, α-monovinylpolydimethylsiloxanes, α-mono(3-acryl-oyloxypropyl) polydimethylsiloxanes, α-mono(acryloyloxy-methyl) polydimethylsiloxanes, α-mono(3-methacryloyloxy-propyl) polydimethylsiloxane, 3-acryloxy-2-hydroxypropylpolydimethylsiloxane or monoallylmonotrimethylsiloxypolydimethyl-siloxane.

In step B), preferably 10 to 60% by weight, more preferably 15 to 50% by weight and most preferably 20 to 50% by weight of ethylenically unsaturated monomers are used, based on the dry weight of the organic polymers and fine inorganic solids used in step A).

Ethylenically unsaturated silanes are used here to an extent of preferably 0 to 3% by weight, more preferably 0.01 to 2% by weight and most preferably 0.1 to 1% by weight, based on the total weight of the ethylenically unsaturated monomers used in step B).

Ethylenically unsaturated monocarboxylic acids are used here to an extent of preferably 0 to 2% by weight, more preferably 0.05 to 1.0% by weight and most preferably 0.1 to 0.5% by weight, based on the total weight of the ethylenically unsaturated monomers used in step B).

Particularly preferred ethylenically unsaturated monomers in step B) are monomer mixtures comprising one or more vinyl esters, especially vinyl acetate, 0 to 1% by weight, especially 0.1 to 1% by weight, of one or more ethylenically unsaturated carboxylic acids, such as acrylic acid, methacrylic acid or crotonic acid, and optionally 0 to 2% by weight, especially 0.1 to 2% by weight, of one or more ethylenically unsaturated silanes, such as vinyltrimethoxysilane, vinyltriethoxysilane, vinylmethyldimethoxysilane or vinylmethyldiethoxysilane; one or more vinyl esters, especially vinyl acetate, 0 to 2% by weight, especially 0.1 to 2% by weight, of ethylenically unsaturated silanes such as vinyltrimethoxysilane, vinyltriethoxysilane, vinylmethyldimethoxysilane or vinylmethyldiethoxysilane, with optional copolymerization of another 2 to 40% by weight of butyl acrylate, VeoVa9 or VeoVa10, vinyl chloride or ethylene, and where the figures in % by weight add up to 100% by weight in each case.

Particularly preferred ethylenically unsaturated monomers in step B) are also monomer mixtures comprising one or more (meth)acrylic esters, such as methyl (meth)acrylate and/or butyl (meth)acrylate, 0 to 2% by weight, especially 0.1 to 2% by weight, of one or more ethylenically unsaturated carboxylic acids, such as acrylic acid, methacrylic acid or crotonic acid, and optionally 0 to 2% by weight, especially 0.1 to 2% by weight, of one or more ethylenically unsaturated silanes, such as vinyltrimethoxysilane, vinyltriethoxysilane, vinylmethyldimethoxysilane or vinylmethyldiethoxysilane; one or more (meth)acrylic esters, such as methyl (meth)acrylate and/or butyl (meth)acrylate, 0 to 2% by weight, especially 0.1 to 2% by weight, of one or more ethylenically unsaturated silanes, such as vinyltrimethoxysilane, vinyltriethoxysilane, vinylmethyldimethoxysilane or vinylmethyldiethoxysilane, with optional copolymerization of another 0 to 50% by weight, especially 0.1 to 50% by weight, of styrene, where the figures in % by weight add up to 100% by weight in each case.

For the polymerization in step B), composite particles from stage A) are initially charged in part or preferably in full, especially in the form of an aqueous dispersion. In this case, steps A) and B) can be executed in immediate succession and optionally in one and the same reactor, i.e. as a one-pot reaction. Alternatively, the composite particles can, however, also be metered in fully or partly during the polymerization in stage B) in the form of an aqueous dispersion or of a powder.

The ethylenically unsaturated monomers in step B) can be initially charged in full or preferably in part, and any remaining residue can be added during the polymerization. Preferably at least 40% by weight, more preferably 60 to 95% by weight, of the ethylenically unsaturated monomers used in step B) are metered in, based on all the ethylenically unsaturated monomers used in step B). The ethylenically unsaturated monomers can be added in the form of an aqueous emulsion or preferably in pure substance. In the case of addition in pure substance, the dispersions of the modified composite particles are obtained with higher solids contents.

The polymerization in step B) is effected by the suspension polymerization process, miniemulsion polymerization process, or preferably by the emulsion polymerization process, the polymerization temperature being generally 20° C. to 100° C., preferably 60° C. to 95° C., and, in the case of copolymerization of gaseous comonomers such as ethylene, operation also being possible under pressure, generally between 5 bar and 100 bar. The polymerization is effected in water. The polymerization is initiated with the water-organic or monomer-organic initiators or redox initiator combinations commonly used for emulsion polymerization or suspension polymerization. Examples of water-organic initiators are sodium persulfate, hydrogen peroxide, azobisisobutyronitrile. Examples of monomer-organic initiators are dicetyl peroxydicarbonate, dicyclohexyl peroxydicarbonate, dibenzoyl peroxide. The initiators mentioned are generally used in an amount of 0.01 to 0.5% by weight, based on the total weight of the monomers. The redox initiators used are combinations of the initiators mentioned in combination with reducing agents. Suitable reducing agents are, for example, sodium sulfite, sodium hydroxymethanesulfinate and ascorbic acid. The amount of reducing agent is preferably 0.01 to 0.5% by weight, based on the total weight of the monomers.

The polymerization is executed preferably at pH values between 6 and 14, and more preferably at pH values between 7.5 and 10.5. At these pH values, it is particularly advantageous when the composite particles from step A) contain units of ethylenically unsaturated carboxylic acids, since this can counteract any separation of the composite particles or any agglomerate formation.

The pH can be adjusted in a known manner by means of organic or inorganic bases or buffers, for example by addition of ammonia, amines or alkali metal hydroxides, for example sodium hydroxide solution. Preferably, no polyvalent ions such as multiply charged metal ions, for example alkaline earth metal ions, are introduced into the composite particles as acids, bases or buffers, since such ions can lead to aggregation of modified composite particles and hence to gellation of the modified composite particles.

Optionally, step A) or, more particularly, step B) can be executed in the presence of one or more emulsifiers. In step B), preferably 1 to 5% by weight of emulsifiers are present, based on the amount of ethylenically unsaturated monomers in step B). Suitable emulsifiers are anionic, cationic or nonionic emulsifiers, for example anionic surfactants such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

To control the molecular weight, it is possible to use chain transfer agents during the polymerization. If chain transfer agents are used, they are typically used in amounts between 0.01 and 5.0% by weight, based on the monomers to be polymerized, and are metered in separately or else premixed with reaction components. Examples of such substances are n-dodecyl mercaptan, tert-dodecyl mercaptan, mercaptopropionic acid, methyl mercaptopropionate, isopropanol and acetaldehyde. Preference is given to using no chain transfer agents.

After conclusion of the polymerization in stage B), it is possible to remove by-products, unconverted starting materials, solvents or other volatile substances by means of distillation, preferably under reduced pressure, and optionally while passing entraining gases through or over, such as air, nitrogen or water vapor. For residual monomer removal, it is also possible to postpolymerize as per common practice.

The modified composite particles preferably have a core-shell structure. In this structure, the composite particles from step A) (composite particles A)) form the core and the polymeric chains formed in the course of polymerization of the ethylenically unsaturated monomers in step B) (polymeric chains B)) the shell or sheath. The composite particles A) and the polymeric chains B) are thus not present, or at least are not exclusively present, as a blend. Especially when the organic polymers from stage A) or the polymers B) contain silane units, the composite particles A) and the polymeric chains B) are joined to one another via covalent bonds. In this case, the products from step B) are grafted composite particles. In grafted composite particles, one or more polymeric chains B) are bound to the composite particles from step A) via chemical bonds.

The modified composite particles have a glass transition temperature Tg of preferably −60° C. to +120° C. and more preferably of −50 to +100° C. The modified composite particles generally exhibit one or two glass transition temperatures, according to the selection of the monomers in steps A) and B).

The modified composite particles thus obtainable are in the form of a dispersion and preferably have a solids content of 40 to 70%, more preferably of 45 to 65% and most preferably of 50 to 60%.

The modified composite particles preferably have a viscosity of 65 to 3000 mPas and more preferably of 75 to 2000 mPas, especially between 80 and 900 mPas (Brookfield viscosity at 25° C. as a 50% dispersion in water).

The inorganic domains of the modified composite particles have mean particle sizes of preferably 2 nm to 300 nm, more preferably of 4 nm to 100 nm and most preferably of 10 nm to 50 nm (determined with the Libra 120 transmission electron microscope from Zeiss).

For production of the modified composite particles in the form of powders, the dispersions of the modified composite particles are dried, optionally with addition of protective colloids as a drying aid. Suitable drying processes are, for example, fluidized bed drying, roll drying, freeze drying or spray drying. Suitable drying auxiliaries are, for example, the abovementioned organic polymers. Preference is given to using polyvinyl alcohols as drying auxiliaries. Preference is given to spray-drying the aqueous mixtures. This spray-drying operation is effected in customary spray-drying systems, and the atomization can be effected by means of one-phase, two-phase or multiphase nozzles or with a rotating disk. The exit temperature is generally selected within the range from 45° C. to 120° C., preferably between 60° C. and 90° C.

In the course of drying, a content of up to 1.5% by weight of antifoam, based on the polymeric constituents, has in many cases been found to be favorable. To increase the storage stability by improving the blocking stability, especially in the case of powders with low glass transition temperature, the powder obtained can be provided with an antiblockign agent (anticaking agent), preferably up to 30% by weight, based on the total weight of polymeric constituents. Examples of antiblocking agents are calcium carbonate or magnesium carbonate, talc, gypsum, silicas, for example finely divided silicas, kaolins, metakaolin, calcined kaolin, silicates having particles sizes preferably in the range from 10 nm to 100 μm.

The viscosity of the dispersion to be dried is adjusted via the solids content such that a value of <1500 mPas (Brookfield viscosity at 20 revolutions and 23° C.), preferably <500 mPas, is obtained.

To improve the performance properties, further additives can be added to the modified composite particles. Further constituents of the modified composite particles present in preferred embodiments are, for example, binders, pigments, fillers, for example zeolites, foam stabilizers, hydrophobizing agents or air pore formers. Preferably, these additives are added during or after the drying of the dispersion.

The modified composite particles thus obtained in the form of powders can be converted to the desired form by subsequent grinding and/or redispersion in water, organic solvents or reactive diluents. Suitable reactive diluents are, for example, the ethylenically unsaturated substance classes and compounds listed above under monomers a) or monomers b). Preferred reactive diluents are ethylenically unsaturated aromatics such as styrene, (meth)acrylates such as ethylene glycol dimethacrylate, or epoxides.

The inventive modified composite particles are stable in organic solvents, reactive diluents or water, or in the form of powders, even without addition of stabilizers, emulsifiers or protective colloids.

The modified composite particles are suitable as binders, cobinders or additives for improving the performance properties of various products. Use of the modified composite particles in coating compositions or adhesives allows, for example, enhancement of the thermal stability or scratch resistance thereof. Adhesives comprising modified composite particles additionally frequently exhibit improved flow characteristics and a stable modulus of elasticity at elevated temperature and, after application, give rise, for example, to adhesive films that can be pulled off. Coating compositions comprising modified composite particles can be used to provide coatings with a matt effect. Equally, the use of the modified composite particles is advantageous in formulations for powder coatings, polymer materials and composite materials, for example for production of polymer components, composite components or packaging materials. The modified composite particles are also suitable for surface treatment for synthetic or natural materials, such as fibers or particles, such as preferably stone, wood, leather, paper, textiles, polymers such as polymer films. In this context, the modified composite particles act, for example, as impregnating agents, sealing agents or as primers for enhancement of adhesion, as a barrier layer, corrosion protection or soil repellent. The soil-repellent effect can be exploited in an advantageous manner especially in the case of corresponding applications in rugs or fitted carpets. The modified composite particles can also be used to produce low-flammability coatings for wood, plastics, leather and paper. Stone can be reinforced or renovated. In products for the packaging industry, addition of the composite particles can produce a gas barrier.

Surprisingly, aqueous dispersions of the inventive modified composite particles even with high solids contents are storage-stable and low viscosity and thus easy to handle. For instance, corresponding dispersions do not have a tendency to gellation and are shear-stable. The modified composite particles form films in an excellent manner, in spite of the high proportion of inorganic constituents therein, which intrinsically do not form films at all. Moreover, the filmed modified composite particles exhibit excellent mechanical properties and strengths, and are water-resistant. This profile of properties means that the inventive modified composite particles are of particular interest, for example, as binders or cobinders for crack-bridging paints. And since the organic or inorganic components in the composite particles in step A), and also the ethylenically unsaturated monomers in step B), can be varied over a wide range in terms of their chemical properties, such as hydrophilicity, lipophilicity or glass transition temperatures, or their relative proportions by weight in the modified composite particles, a wide variety of products are obtainable, and so the modified composite particles can be tailored for a multitude of applications or requirements and hence open up a high degree of flexibility.

Furthermore, the modified composite particles are thermally stable and UV-resistant, enhance the color intensity of paints and adhere on different substrates but are nevertheless non-tacky. The use of the dispersions with high solids contents in coating compositions leads to coatings having a lesser tendency to crack formation.

The examples which follow serve to illustrate the invention in detail and should in no way be interpreted as a restriction.

Preparation of Organic Polymer 1

A reactor of capacity 3 liters was initially charged with 470 g of deionized water, 3 g of sodium laurylsulfate, 10 g of Genapol PF 20 (from Clariant), 1.0 g of potassium peroxodisulfate and 2 g of ammonia (12.5% strength) in a nitrogen atmosphere, and heated to 40° C. while stirring.

At this temperature, 70 g of a mixture of the following composition was introduced into the reactor:

| vinyltriethoxysilane | 2.4 g |
| methacrylic acid | 24 g |
| butyl acrylate | 285.6 g |
| styrene | 52.8 g |
| methyl methacrylate | 115.2 g |
| dodecyl mercaptan | 1.0 g |

Subsequently, the temperature was increased to 80° C. 30 minutes after the attainment of 80° C., the remainder of the aforementioned monomer mixture was metered into the reactor within 100 minutes. After metered addition had ended, the mixture was stirred at 85° C. for 1 hour. The pH during the polymerization was kept within the range from 3 to 4.5.

Subsequently, the dispersion was cooled to 60° C., the pH was adjusted to 9 with an ammonia solution (215 g of water+17 g of $NH_3$, 12.5% strength) and stirred for 30 minutes and cooled to room temperature.

A solution of the organic polymer having a solids content of 41% and a viscosity of 6500 mPa·s was obtained (Brookfield viscosity at 25° C.)

EXAMPLE 1

Modified Composite Particles 500 g of the aforementioned solution of the organic polymer 1 (solids content 41%) were mixed with 400 g of a silica sol (Bindzil 2040, trade name of Ekanobel, solids content 41%) at pH 9 and stirred at 60° C. for 2 hours.

The composite particles thus obtained in the form of a dispersion (stage A)) has a mean particle size of 85 nm (determined with the Nano-Sizer instrument from Coulter Electronics, LTD) and a viscosity of 1300 mPa·s (Brookfield viscosity at a solids content of 41% and pH 9 and a temperature of 23° C.)

Subsequently, the temperature was increased to 80° C. and 50 g of the monomer mixture specified below were added to the reactor, then 10 g of potassium peroxodisulfate solution (4% strength) was added to the reactor and the rest of the monomer mixture was metered in within 60 minutes.

Monomer mixture:

| vinyltriethoxysilane | 0.5 g |
| methyl methacrylate | 62.0 g |
| butyl acrylate | 90.5 g |
| styrene | 17.0 g |

After the end of metered addition of the monomer mixture, the reaction mixture was stirred at 85° C. for another 2.0 hours. After cooling, the reaction mixture was filtered through a Nylon sieve (mesh size: 150 μm).

The modified composite particles thus obtained were in the form of a dispersion having a solids content of 50% and a viscosity of 120 mPa·s (Brookfield viscosity, 23° C.). The modified composite particles had a mean particle size of 125 nm (determined with the Nano-Sizer instrument from Coulter Electronics, LTD).

The dispersion of the modified composite particles, in spite of a higher solids content, thus surprisingly has a lower viscosity than the intermediate from stage A).

EXAMPLE 2

Modified Composite Particles (One-Pot Reaction)

A reactor of capacity 3 liters was initially charged with 470 g of deionized water, 3 g of sodium laurylsulfate, 10 g of Genapol PF 20 (from Clariant), 1.0 g of potassium peroxodisulfate and 2 g of ammonia (12.5% strength) in a nitrogen atmosphere, and the mixture was heated to 40° C. while stirring.

At this temperature, 70 g of a mixture of the following composition were added to the reactor:

| | |
|---|---|
| vinyltriethoxysilane | 2.4 g |
| methacrylic acid | 24 g |
| butyl acrylate | 285.6 g |
| styrene | 52.8 g |
| methyl methacrylate | 115.2 g |
| dodecyl mercaptan | 1.0 g |

Subsequently, the temperature was increased to 80° C. 30 minutes after the attainment of 80° C., the remainder of the monomer mixture was metered into the reactor within 100 minutes. After the metered addition had ended, the mixture was stirred at 85° C. for one hour. The pH was kept at 3 to 4.5 during the polymerization.

Subsequently, the dispersion was cooled to 60° C., the pH was adjusted to 9 with an ammonia solution (215 g of water+17 g of NH$_3$, 12.5% strength) and the mixture was stirred for 30 minutes. In this way, the organic polymer 2 was obtained.

Subsequently, 958 g of silica sol (Bindzil 2040, solids content 41%) were added to the reactor and the mixture was stirred at 60° C. for 2 hours.

In this way, the composite particles from stage A were obtained in the form of a dispersion.

Subsequently, the temperature was increased to 80° C. and 100 g of the monomer mixture specified below were added to the reactor, then 15 g of potassium peroxodisulfate solution (4% strength) were added to the reactor, and the remainder of the monomer mixture was metered in within 120 minutes.

Monomer mixture:

| | |
|---|---|
| vinyltriethoxysilanes | 1.2 g |
| methyl methacrylate | 148.5 g |
| butyl acrylate | 216.8 g |
| styrene | 40.7 g |

After the end of metered addition of the monomer mixture, the composite dispersion was stirred at 85° C. for another 2.0 hours. After cooling, the composite dispersion was filtered through a Nylon sieve (mesh size: 150 μm).

The modified composite particles thus obtained were in the form of a dispersion having a solids content of 50.2% and a viscosity of 150 mPa·s (Brookfield viscosity at 25° C.). The modified composite particles had a mean particle size of 125 nm (determined with the Nano-Sizer instrument from Coulter Electronics, LTD).

The invention claimed is:
1. A modified composite particles obtainable by a process comprising:
A) mixing silicon dioxide in the form of waterglass or silica sols and one or more organic polymers in a solvent or a mixture of a plurality of solvents, with fixing of silicon dioxide onto organic polymers to form the composite particles, and where the organic polymers are selected from the group consisting of:
1) polymers of vinyl esters having 3 to 12% by weight of ethylenically unsaturated carboxylic acids selected from acrylic acid or methacrylic acid and 0.1 to 3% by weight of ethylenically unsaturated silanes selected from vinyltrimethoxysilane, vinyltriethoxysilane, vinylmethyldimethoxysilane or vinylmethyldiethoxysilane;
2) polymers of vinyl esters with 0.1 to 3% by weight of ethylenically unsaturated silanes selected from vinyltrimethoxysilane, vinyltriethoxysilane, vinylmethyldimethoxysilane or vinylmethyldiethoxysilane, where the polymers of vinyl esters may also contain 5 to 45% by weight of butyl acrylate, vinyl esters of alpha-branched monocarboxylic acids having 5 to 13 carbon atoms or ethylene;
3) polymers of (meth)acrylic esters with 3 to 12% by weight of ethylenically unsaturated carboxylic acids selected from acrylic acid or methacrylic acid and 0.1 to 3% by weight of ethylenically unsaturated silanes selected from vinyltrimethoxysilane, vinyltriethoxysilane, vinylmethyldimethoxysilane or vinylmethyldiethoxysilane; and
4) polymers of (meth)acrylic esters with 0.1 to 3% by weight of ethylenically unsaturated silanes selected from vinyltrimethoxysilane, vinyltriethoxysilane, vinylmethyldimethoxysilane or vinylmethyldiethoxysilane, where the polymers of (meth)acrylic esters may also contain 0 to 50% by weight of styrene;
based on the total weight of the ethylenically unsaturated monomers used in step A), where the % by weight add up to 100% by weight, wherein subsequently
B) a monomer mixtures of one or more ethylenically unsaturated monomers selected from the group consisting of:
1) one or more vinyl esters, 0 to 2% by weight of one or more ethylenically unsaturated carboxylic acids selected from acrylic acid, methacrylic acid or crotonic acid, and 0 to 3% by weight of one or more ethylenically unsaturated silanes selected from vinyltrimethoxysilane, vinyltriethoxysilane, vinylmethyldimethoxysilane or vinylmethyldiethoxysilane;
2) one or more vinyl esters, 0 to 3% by weight of ethylenically unsaturated silanes selected from vinyltrimethoxysilane, vinyltriethoxysilane, vinylmethyldimethoxysilane or vinylmethyldiethoxysilane, with optional copolymerization of another 2 to 40% by weight of butyl acrylate, vinyl esters of alpha-branched monocarboxylic acids having 5 to 13 carbon atoms, vinyl chloride or ethylene;
3) one or more (meth)acrylic esters, 0 to 2% by weight of one or more ethylenically unsaturated carboxylic acids selected from acrylic acid, methacrylic acid or crotonic acid, 0 to 3% by weight of one or more ethylenically unsaturated silanes selected from vinyltrimethoxysilane, vinyltriethoxysilane, vinylmethyldimethoxysilane or vinylmethyldiethoxysilane; and

4) one or more (meth)acrylic esters, 0 to 3% by weight of one or more ethylenically unsaturated silanes selected from vinyltrimethoxysilane, vinyltriethoxysilane, vinylmethyldimethoxysilane or vinylmethyldiethoxysilane, with optional copolymerization of another 0 to 50% by weight of styrene;

based on the total weight of the ethylenically unsaturated monomers used in step B), where the % by weight add up to 100% by weight, and wherein the ethylenically unsaturated monomers are polymerized in a presence of the composite particles from step A), wherein the modified composite particles comprise a core-shell structure in which the composite particles from step A) form a core and polymeric chains formed in polymerization of the ethylenically unsaturated monomers in step B) form a shell.

2. The modified composite particles according to claim 1, which have a Tg of −60° C. to 120° C.

3. The modified composite particles according to claim 1, which are in a form of a dispersion with a solids content of 40 to 70%.

4. The modified composite particles according to claim 1, which have a viscosity of 65 to 3000 mPas at 25° C. as a 50% dispersion in water.

5. The modified composite particles according to claim 1, further comprising during the polymerization step B) between 0.01 and 5.0% by weight of chain transfer agents, based on the weight of monomers to be polymerized.

6. The modified composite particles according to claim 5, wherein the chain transfer agents are selected from the group consisting of: n-dodecyl mercaptan, tert-dodecyl mercaptan, mercaptopropionic acid, methyl mercaptopropionate, isopropanol and acetaldehyde.

7. A modified composite particles comprising:
  (a) cores comprising composite particles comprising silicon dioxide in the form of waterglass or silica sols bonded to organic polymers
selected from the group consisting of:
  1) polymers of vinyl esters having 3 to 12% by weight of ethylenically unsaturated carboxylic acids selected from acrylic acid or methacrylic acid and 0.1 to 3% by weight of ethylenically unsaturated silanes selected from vinyltrimethoxysilane, vinyltriethoxysilane, vinylmethyldimethoxysilane or vinylmethyldiethoxysilane;
  2) polymers of vinyl esters with 0.1 to 3% by weight of ethylenically unsaturated silanes selected from vinyltrimethoxysilane, vinyltriethoxysilane, vinylmethyldimethoxysilane or vinylmethyldiethoxysilane, where the polymers of vinyl esters may also contain 5 to 45% by weight of butyl acrylate, vinyl esters of alpha-branched monocarboxylic acids having 5 to 13 carbon atoms or ethylene;
  3) polymers of (meth)acrylic esters with 3 to 12% by weight of ethylenically unsaturated carboxylic acids selected from acrylic acid or methacrylic acid and 0.1 to 3% by weight of ethylenically unsaturated silanes selected from vinyltrimethoxysilane, vinyltriethoxysilane, vinylmethyldimethoxysilane or vinylmethyldiethoxysilane; and
  4) polymers of (meth)acrylic esters with 0.1 to 3% by weight of ethylenically unsaturated silanes selected from vinyltrimethoxysilane, vinyltriethoxysilane, vinylmethyldimethoxysilane or vinylmethyldiethoxysilane, where the polymers of (meth)acrylic esters may also contain 0 to 50% by weight of styrene;

based on the total weight of the ethylenically unsaturated monomers used in the core, where the % by weight add up to 100% by weight; and
  (b) shells surrounding the cores, and comprising polymers of ethylenically unsaturated monomers selected from the group consisting of:
    1) one or more vinyl esters, 0 to 2% by weight of one or more ethylenically unsaturated carboxylic acids selected from acrylic acid, methacrylic acid or crotonic acid, and 0 to 3% by weight of one or more ethylenically unsaturated silanes selected from vinyltrimethoxysilane, vinyltriethoxysilane, vinylmethyldimethoxysilane or vinylmethyldiethoxysilane;
    2) one or more vinyl esters, 0 to 3% by weight of ethylenically unsaturated silanes selected from vinyltrimethoxysilane, vinyltriethoxysilane, vinylmethyldimethoxysilane or vinylmethyldiethoxysilane, with optional copolymerization of another 2 to 40% by weight of butyl acrylate, vinyl esters of alpha-branched monocarboxylic acids having 5 to 13 carbon atoms or ethylene;
    3) one or more (meth)acrylic esters, 0 to 2% by weight of one or more ethylenically unsaturated carboxylic acids selected from acrylic acid, methacrylic acid or crotonic acid, 0 to 3% by weight of one or more ethylenically unsaturated silanes selected from vinyltrimethoxysilane, vinyltriethoxysilane, vinylmethyldimethoxysilane or vinylmethyldiethoxysilane; and
    4) one or more (meth)acrylic esters, 0 to 3% by weight of one or more ethylenically unsaturated silanes selected from vinyltrimethoxysilane, vinyltriethoxysilane, vinylmethyldimethoxysilane or vinylmethyldiethoxysilane, with optional copolymerization of another 0 to 50% by weight of styrene;

based on the total weight of the ethylenically unsaturated monomers used in the shell, where the % by weight add up to 100% by weight, wherein the modified composite particles have a viscosity of 65 to 3000 mPas at 25° C. as a 50% dispersion in water, and wherein the modified composite particles comprise a core-shell structure in which the composite particles of (a) form a core and polymeric chains formed in polymerization of the ethylenically unsaturated monomers in (b) form a shell.

8. A process for producing modified composite particles by
  A) mixing silicon dioxide in the form of waterglass or silica sols and one or more organic polymers in a solvent or a mixture of a plurality of solvents, with fixing of the silicon dioxide onto the organic polymers to form the composite particles, and where the organic polymers are selected from the group consisting of:
    1) polymers of vinyl esters having 3 to 12% by weight of ethylenically unsaturated carboxylic acids selected from acrylic acid or methacrylic acid and 0.1 to 3% by weight of ethylenically unsaturated silanes selected from vinyltrimethoxysilane, vinyltriethoxysilane, vinylmethyldimethoxysilane or vinylmethyldiethoxysilane;
    2) polymers of vinyl esters with 0.1 to 3% by weight of ethylenically unsaturated silanes selected from vinyltrimethoxysilane, vinyltriethoxysilane, vinylmethyldimethoxysilane or vinylmethyldiethoxysilane, where the polymers of vinyl esters may also contain 5 to 45% by weight of butyl acrylate, vinyl esters of alpha-branched monocarboxylic acids having 5 to 13 carbon atomsor ethylene;

3) polymers of (meth)acrylic esters with 3 to 12% by weight of ethylenically unsaturated carboxylic acids selected from acrylic acid or methacrylic acid and 0.1 to 3% by weight of ethylenically unsaturated silanes selected from vinyltrimethoxysilane, vinyltriethoxysilane, vinylmethyldimethoxysilane or vinylmethyldiethoxysilane; and 4) polymers of (meth)acrylic esters with 0.1 to 3% by weight of ethylenically unsaturated silanes selected from vinyltrimethoxysilane, vinyltriethoxysilane, vinylmethyldimethoxysilane or vinylmethyldiethoxysilane, where the polymers of (meth)acrylic esters may also contain 0 to 50% by weight of styrene;

based on the total weight of the ethylenically unsaturated monomers in step A), where the % by weight adds up to 100% by weight; wherein subsequently B) a monomer mixture of one or more ethylenically unsaturated monomers selected from the group consisting of:

1) one or more vinyl esters, 0 to 2% by weight of one or more ethylenically unsaturated carboxylic acids selected from acrylic acid, methacrylic acid or crotonic acid, and 0 to 3% by weight of one or more ethylenically unsaturated silanes selected from vinyltrimethoxysilane, vinyltriethoxysilane, vinylmethyldimethoxysilane or vinylmethyldiethoxysilane;

2) one or more vinyl esters, 0 to 3% by weight of ethylenically unsaturated silanes selected from vinyltrimethoxysilane, vinyltriethoxysilane, vinylmethyldimethoxysilane or vinylmethyldiethoxysilane, with optional copolymerization of another 2 to 40% by weight of butyl acrylate, vinyl esters of alpha-branched monocarboxylic acids having 5 to 13 carbon atoms, vinyl chloride or ethylene;

3) one or more (meth)acrylic esters, 0 to 2% by weight of one or more ethylenically unsaturated carboxylic acids selected from acrylic acid, methacrylic acid or crotonic acid, 0 to 3% by weight of one or more ethylenically unsaturated silanes selected from vinyltrimethoxysilane, vinyltriethoxysilane, vinylmethyldimethoxysilane or vinylmethyldiethoxysilane; and 4) one or more (meth)acrylic esters, 0 to 3% by weight of one or more ethylenically unsaturated silanes selected from vinyltrimethoxysilane, vinyltriethoxysilane, vinylmethyldimethoxysilane or vinylmethyldiethoxysilane, with optional copolymerization of another 0 to 50% by weight of styrene;

based on the total weight of the ethylenically unsaturated monomers used in step B), where the % by weight adds up to 100% by weight, and wherein the ethylenically unsaturated monomers are polymerized in a presence of the composite particles from step A), and wherein the modified composite particles comprise a core-shell structure in which the composite particles from step A) form a core and polymeric chains formed in polymerization of the ethylenically unsaturated monomers in step B) form a shell.

9. The process for producing modified composite particles as claimed in claim 8, wherein a proportion of silicon dioxide in step A) is 2 to 97% by weight, based on a dry mass of a total amount of organic polymers and fine silicon dioxide.

10. The process for producing modified composite particles as claimed in claim 8, wherein a proportion of organic polymers in step A) is 3 to 98% by weight, based on a dry mass of a total amount of organic polymers and silicon dioxide.

11. The process for producing modified composite particles as claimed in claim 8, wherein 10 to 60% by weight of ethylenically unsaturated monomers are used in step B), based on a dry weight of the organic polymers and silicon dioxide from step A).

12. The process for producing modified composite particles as claimed in claim 8, wherein the modified composite particles are in a form of dispersions having a solids content of 40 to 70%.

13. The process for producing modified composite particles as claimed in claim 12, wherein the modified composite particles in the form of dispersions having a solids content of 50% and a viscosity of 65 to 3000 mPas at 25° C.

* * * * *